United States Patent [19]
Colin

[11] 3,788,261
[45] Jan. 29, 1974

[54] LOCKING DEVICE MORE PARTICULARLY FOR CONNECTION BETWEEN A BARGE AND A PUSHER TUG

[75] Inventor: Jean Paul Colin, Nantes, France

[73] Assignee: Societe Financiere Et Industrielle Des Ateliers Et Chantiers De Bretagne, Nantes, Loire Atlantique, France

[22] Filed: Feb. 10, 1972

[21] Appl. No.: 225,237

[30] Foreign Application Priority Data
Aug. 31, 1971 France .............................. 7132331

[52] U.S. Cl............................................. 114/235 A
[51] Int. Cl............................................ B63b 21/60
[58] Field of Search....... 114/235 A, 235 R; 188/67; 92/15, 23; 85/32 V, 1 L, 1 R; 287/103 A

[56] References Cited
UNITED STATES PATENTS
1,440,613  1/1923  Mathias................................. 85/1 L
3,023,797  3/1962  Greene............................. 85/1 L X FOREIGN PATENTS OR APPLICATIONS
1,324,061  3/1963  France ........................... 114/235 R Primary Examiner—George E. A. Halvosa
Assistant Examiner—Paul E. Sauberer
Attorney, Agent, or Firm—Stevens, Davis, Miller & Mosher

[57] ABSTRACT

A locking device more particularly for the connection between a barge and tug comprises an interrupted screw and nut assembly.

7 Claims, 7 Drawing Figures

LOCKING DEVICE MORE PARTICULARLY FOR CONNECTION BETWEEN A BARGE AND A PUSHER TUG

This invention relates to a locking arrangement primarily for use in connecting devices between seagoing barges and pusher tugs.

Of course, seagoing barge/pusher tug combinations need special connection facilities between the barge and the tug because of the extreme forces which the connection must be able to withstand in very bad weather conditions. For instance, the tug bows can have inclined surfaces engageable between corresponding surfaces at the barge stern by the thrust of the tug screws, after the fashion of a pyramidal wedge engaging in a pyramidal recess. To ensure that the connection is very strong at the end of the engaging movement, a clamping force is provided by a very powerful hydraulic ram or the like whose casing is rigidly secured to the tug while the rod of the ram or actuator is rigidly secured to the barge. The clamping force must be maintained throughout the voyage. At the end of the voyage the tug is disconnected from the barge, an operation in which more force is required than for clamping because of the jamming effects (which depend upon the inclination of the surfaces and upon the coefficient of friction of the metal sheeting). The actuator is responsible for providing the forces for disengagement.

The clamping force must be maintained through the voyage, more particularly in bad weather, and must not be affected by any failure of the hydraulic station. Consequently, the actuator rod must be locked mechanically upon completion of the operation of connecting the barge to the tug.

It is an object of this invention to provide mechanical means for this locking. It is another object of this invention to provide means which provide as high a safety factor as is provided by the pressurised actuator and which can also produce locking in the exact instantaneous position of the actuator rod at the time when the latter means are operated. The last-mentioned position is never exactly the same, varying at each engagement operation because of slight variations of the maximum pressure in the actuator cylinder, because the tug never presents in exactly the same position to the barge and, more particularly, because the barge to which any given tug is connected is always different from the previous barge. The resulting variations are not more than from 0.1 to 0.2 metre. Upon the completion of hydraulic actuation the mechanical locking is operated and the ram or actuator ceases to be energised, whereafter forces are transmitted by the mechanical locking facility alone.

Figure 1:
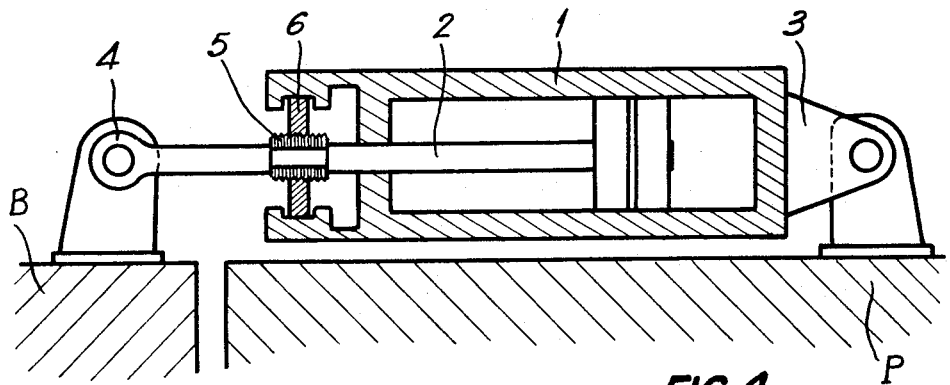
FIG. 1 is an overall view of the apparatus.

Referring to FIG. 1, a ram or actuator casing 1 terminates in an articulated yoke 3 which transmits forces to a pusher tug. A system 4 providing a connection to the barge (hook or yoke or any other system) is disposed at the end of actuator rod 2. The same is retracted substantially completely in the navigation position. The rod 2 needs to be locked in this position, which is never the same but which, as just stated, varies by not more than about 0.1 meter from its average position.

Rod 2 is extended by a widened or thickened part 5 which merges into the barge connection system 4. Since the rod 2 is retracted substantially completely after locking, part 5 is near the end of the actuator casing. Part 5 is machined like the male element of an interrupted-thread type screw-and-nut system. Of course, this kind of locking, which is current in artillery breeches, comprises a nut-and-screw system in which each of the metal members is reduced to the thread troughs over $n$ cylindrical bands bounded by cylinder generatrices of angular opening $2\pi/2n$, with two consecutive smooth bands – i.e., flattened screwthreads being separated from one another by a band which has the same angular opening $2\pi/2n$, but in which the screwthreads are retained. When the plain sectors of one member are presented to the screwthreaded sectors of the other member, the screw is slid into the nut, whereafter the respective screwthreadings are engaged with one another by a rotation through $2\pi/2n$.

Rod 2 extends through a nut 6 which is formed with interrupted screwthreads so as to cooperate with the screwthreading of part 5. Nut 6 can rotate around itself but is axially connected to the actuator casing by very rugged abutments. Nut 6 is placed at such a distance from the actuator casing that upon the completion of clamping — i.e., when the rod 2 is virtually completely retracted — the screwthreaded portion of part 5 extends completely through nut 6, the length of part 5 being greater than the thickness of the nut 6 by a little more than 0.2 m to allow for the uncertainty of the end-of-clamping position.

At the time at which the tug engages with the barge, the nut 6 is in a position such that the screwthreads are disengaged. Actuator rod 2 is pushed fully out. End 4 is connected to the barge. Pressure is applied to the opposite surface of the actuator piston and the rod moves back, connecting the tug to the barge, as far as the locking position. A changeover should then be made from hydraulic locking to mechanical locking by turning the nut and fully engaging the respective screwthreads.

Unfortunately, in most cases when the nut is rotated the spaces and lands of the screwthreaded parts of the screw and nut are not opposite one another and the screw and nut cannot be turned through $2\pi/2n$ revolutions to produce locking. The nut must be moved slightly until the nut and screw coincide and the nut can be rotated.

Figure 2:
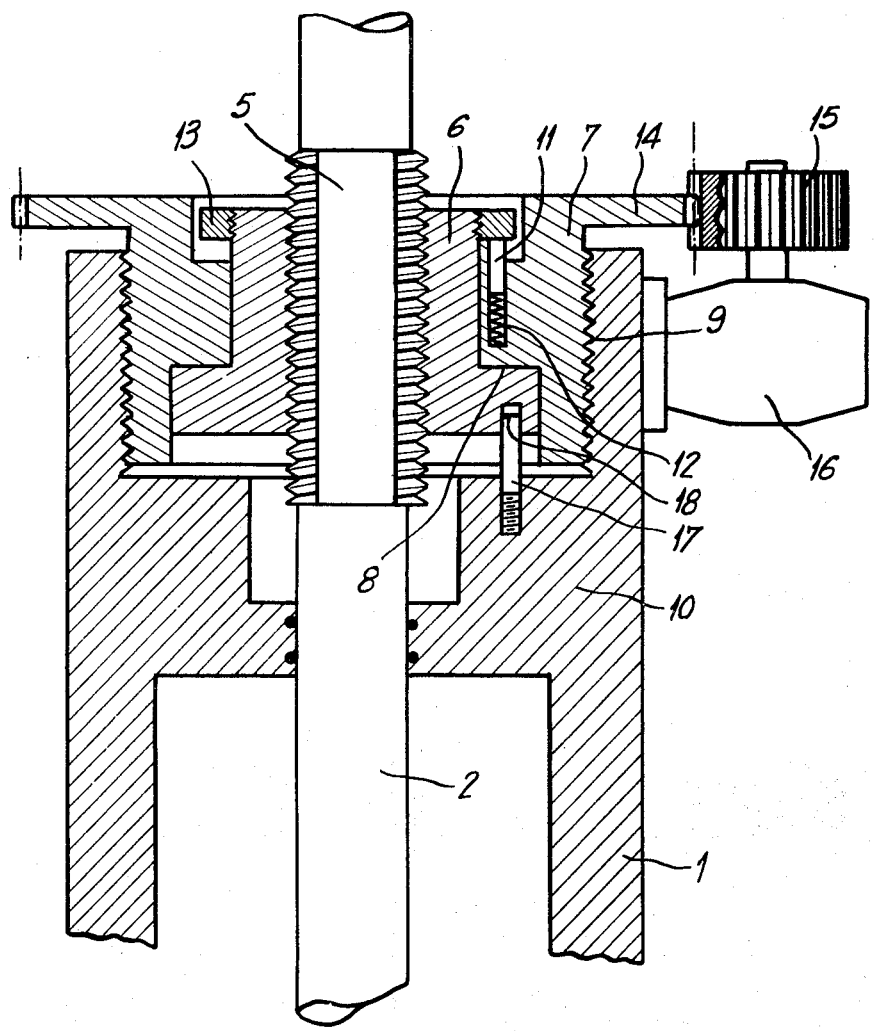
FIG. 2 is a section through the locking mechanism according to this invention.

According to the invention, to achieve such movement the nut 6 (FIG. 2) has around it an outer concentric ring 7. The nut 6 and ring 7 have a common plane bearing surface 8. After entering into screwthreaded engagement with the rod and with effect from the time when the actuator ceases to be pressurised, the nut tends to be moved away from the actuator casing by the forces tending to separate the two vessels. Surface 8 transmits these forces to the ring 7, which transmits them to the actuator casing. Accordingly, ring 7 has peripheral screwthreading 9 to the same hand and of the same pitch as the interrupted screwthreading of nut 6. Screwthreading 9 is engaged in a tapping of a sleeve 10 rigidly secured to actuator casing 1.

The nut rotates solidly with the ring through the agency of means which keep the bearing surfaces of the nut and ring clamped fairly tightly together to an extent sufficient to produce a friction force developing a limited drive torque. By way of non-limitative example, one way of producing a clamping of this kind is by means of a number of cylindrical tappets 11 which are received in blind apertures in ring 7 and which are biased by strong compression springs 12, the tappet heads bearing on a rim 13 rigidly secured to nut 6.

Ring 7 is rigidly secured to a concentric toothed disc 14 meshing with a straight-toothed pinion 15 driven by a motor 16.

Once maximum hydraulic clamping has been achieved, motor 16 is started so as to screw the moving members tighter. The ring is therefore screwed into sleeve 10. However, the nut, which tends to turn because of friction between the bearing surfaces, cannot rotate since the profiles of the interrupted screwthreads do not coincide with one another. The nut therefore just moves rectilinearly and parallel to the axis of the actuator rod, the bearing surfaces 8 remaining in contact.

Once the profiles coincide with one another, the nut can rotate and its screwthreads engage in the screwthreads of the actuator rod. The movement continues until full engagement — i.e., for a rotation of $2\pi/2n$ — whereupon an abutment 17 stops rotation of the nut. The motor, as it continues to rotate, tends to force the ring into the sleeve and therefore to clamp the ring against the nut on the bearing surface. After a short take-up movement, the system is stopped by the motor "seizing," unless a force limiter is provided between the motor and the pinion 15.

As a non-limitative example the abutment 17 can be a finger which is rigidly secured to the actuator casing and which is engaged in a circular slot 18 extending over a sector of not more than $2\pi/2n$ plus the diameter of the finger 17. When the same abuts one end of the slot the screwthreads are fully released; when the finger abuts the other end of the slot the screwthreads are fully engaged.

For mechanical release, the actuator is pressurised enough to cancel the load operative on the sleeve and actuator rod screwthreads and the motor is run to the opposite hand. In practice the motor is run, and then the pressure applied to the actuator is increased. Once the screwthreads are free enough the nut 6 rotates and releases the actuator rod.

Motor 16 can be hydraulic or pneumatic or electric. Preferably, it is a hydraulic motor with a maximum torque such that there is no risk of breaking the tooth systems of the wheel 14 and pinion 15 when the latter is immobilised at the end of the locking operation. No force limiter is therefore needed. The slow rotation and high torque make a hydraulic motor very suitable for this purpose.

The motor control should have an interlock facility to obviate any risk of the following occurring.

When the interrupted-thread nut-and-screw system is machined, two clearances are left. The first clearance is left between the male and female screwthreads to preclude any risk of seize-up in tightening (clearance between screwthreads). The second clearance or backlash is operative between the cross-cut and non-cross-cut portions of the threads and enables the screw to slide properly in the nut without any risk of accidental jamming between cross-cut ends of the screwthreads (sliding clearance).

When the motor is started the nut first makes a slight helical movement corresponding to about half of the sliding clearance. As a rule, the edges of the nut screwthreads then abut the edges of the screw, the screwthreads not being in coincidence. The nut then starts to slide longitudinally as mentioned previously.

Figure 3:
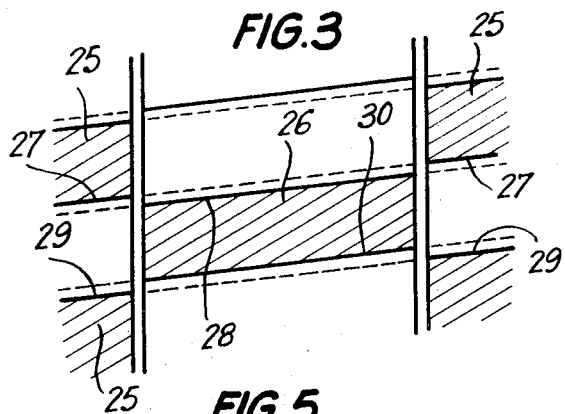
FIGS. 3–5 are developed partial views showing the meshing of the screwthreads of the locking device.
Figure 4:
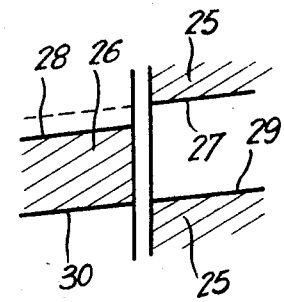
Figure 5:
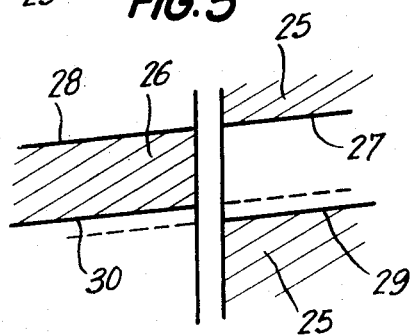

However, the opposite case may occur occasionally - i.e., with the screwthreads in a coincidence position the screw may continue its helical movement until full engagement. FIGS. 3–5 relate to the latter case; they are developed views in a plane of a part of the screw-and-nut assembly through a coaxial cylinder extending half-way along the height of the screwthreads at the time at which the motor starts. Hatched surfaces 25 represent the screw screwthread sections and hatched surfaces 26 represent the nut screwthread sections. The blocking force is transmitted via flanks 27, 28; after locking, flanks 29, 30 are separated by the full thread clearance.

The case of maximum coincidence between the profiles is shown in FIG. 3, with the thread clearance distributed equally between all the flanks of the thread. FIG. 4 shows the extreme case in which the distance between the flanks 27 and 28 is equal to the thread clearance. The flanks 29, 30 are in extension of one another. If there is actual mechanical contact there will be a very slight sliding movement before screwing begins.

In the other extreme case, shown in FIG. 5, flank 28 is in extension of flank 27. Either a screwing or a sliding movement occurs according as flank 27 is slightly to one side or the other of this ideal position. Very near this position there is a very narrow zone in which the perpendicular to the bearing surfaces makes an angle less than the angle of friction with the screwing direction. In this zone jamming occurs, the motor jams and the connection cannot be screwed up. The profiles may coincide rarely in this way and jamming is even more exceptional; however, jamming must be obviated since it prevents mechanical locking of the actuator.

According to the invention, to obviate this risk an indicator of screw longitudinal position moves past a scale on the nut. A zone, e.g., about a quarter of a pitch long, is defined in which the jamming position is e.g., at the centre. Starting of the motor for mechanical locking is inhibited when the indicator is in such zone.

In practice, a sensor can continuously check the indicator. When the operator operates the locking contactor, the motor can start in the screwing direction subject to the detector finding the indicator to be out of the forbidden or inhibited zone. If this is not the case, operation of the locking contactor starts the motor to the opposite hand (unscrewing). The nut slides away from the actuator casing until the detector detects the indicator as having left the forbidden zone, whereupon the motor stops, then starts in the required direction (screwing), and the interlock is cut out of circuit until the end of locking (since it would operate again as the nut approached the screwing position). The indicator position detector can be a contactor which is mounted on the nut and whose sensing element rests on the screw tooth. Alternatively, the detector can be a magnetic proximity detector borne by the nut, a signal being triggered by the presence of the crest of a screw screwthread.

Figure 6:
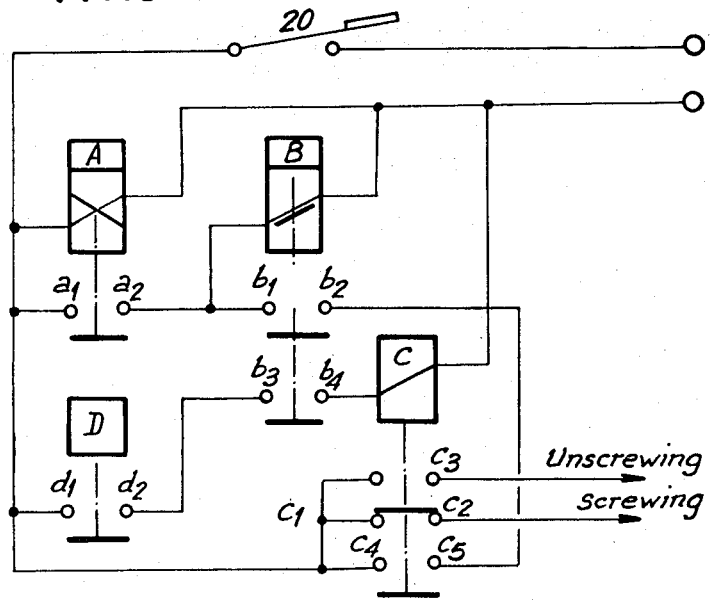
FIGS. 6–7 are diagrammatic views of means for obviating jamming of the cooperating members.

FIG. 6 shows a circuit diagram for a device of this kind comprising: a tough contactor or a proximity detector D having a contact $d_1, d_2$; a transient-make relay A having a normally open contact set $a_1, a_2$ which when energised closes for a fraction of a second — long enough to attract the armatures of another relay — then remains open until subsequent energisation; a relay B whose opening is delayed for a brief fraction of a second, e.g. 0.2 second, and which had contacts $b_1$, $b_2$ and $b_3$, $b_4$, and a conventional relay C.

Relay C comprises changeover contacts $C_1$, $C_2$, $C_3$ and contacts $C_4$, $C_5$. With the relay off the contacts $C_1$, $C_2$ make, and if current is applied via $C_1$ the contactor or solenoid valve controlling motor 16 starts the same in the screwing direction. When relay C is energised its contacts $C_1$ and $C_3$ make to start motor 16 running in the unscrewing direction.

For locking, a main contactor 20 is closed to energise the system. The brief closure of contacts $a_1$, $a_2$ of relay A energises relay B which does not drop immediately because of its delay feature.

If the respective screwthreads are positioned relatively to one another in the dangerous zone with jamming at the centre, detector D closes contacts $d_1$, $d_2$ and, via contacts $b_3$, $b_4$ (B having picked up), relay C picks up and provides a make via its contacts $C_1$, $C_3$, the motor starting to run in the unscrewing direction.

Relay C also closes its contacts $C_4$, $C_5$ to enable relay B to stick via the closed contacts $b_1$, $b_2$ of relay B.

Once the screwthreads have moved away from the dangerous position, the detector opens contacts $d_1$, $d_2$ so that the relay C drops. The motor stops and starts to run in the screwing direction. Since relay C is not energised, the contacts $C_4$ and $C_5$ open so that, after a very brief delay, relay B drops and opens contacts $b_1$, $b_2$, and $b_3$, $b_4$. During the screwing movement the screwthreads return to the dangerous zone, whereupon the detector closes contacts $d_1$, $d_2$; however, since the circuit is not made, the contacts $b_3$, $b_4$ being open, relay C stays "off" and screwing is completed.

The reason for the very brief delay feature of relay B is that the latter causes relay C to pick up, which provides the stick feature for relay B. There would therefore be a risk of B dropping before the stick is established.

Actually, the motor starts immediately the danger zone is entered, then runs in the opposite direction, so that it re-enters the danger zone; however, because of the inertia of the moving parts and because of the differential of the detector, there is left between detection of entry and detection of exit an appreciable time in which relay B has plenty of time to open despite its brief delay feature.

The invention provides other ways and means of obviating a risk of jamming.

If jamming occurs it causes the motor to seize up almost immediately at starting. This virtually immediate stoppage is detected by a delay logic which immediately starts the motor in the opposite direction for a time which depends upon one another delay feature and which is roughly equal to the time taken for the nut to move, e.g., over a distance corresponding to half of one pitch. Upon completion of this reverse running the motor starts to run in the screwing direction until the completion of locking.

Figure 7:
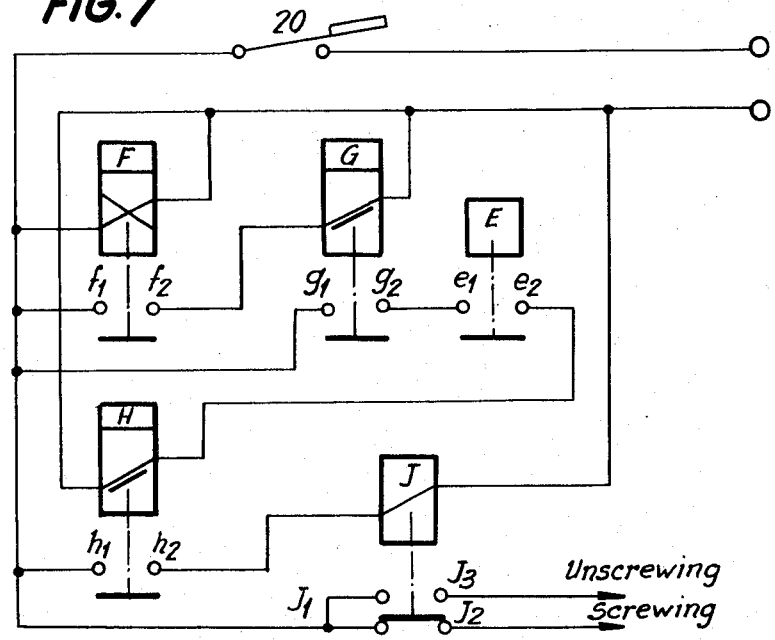

FIG. 7 is a corresponding diagram. This suggestion is of use only in the case in which screwing is performed by an electric motor, since jamming can be detected by the appearance of overcurrent in the line of the jammed motor. The equivalent pressure peak is much less marked in the case of a hydraulic motor and might be inadequate for detection.

The equipment comprises:

A relay E which acts as detector and which is connected in the motor line and which has a normally open contact set $e_1$, $e_2$;

a transient-make relay F which has a contact set $f_1, f_2$;

a first relay G whose opening is delayed for slightly longer than the time which the nut takes to turn through an angle equal to the sliding clearance (as an example, an angle of $360°/20n$, knowing that the screw and the nut each have n screwthreaded sectors separated by $n$ plain intervals), the relay G having a contact set $g_1$, $g_2$;

a second relay H whose opening is delayed for a time corresponding to the time taken by the nut to turn through an angle equal to 25 percent of the pitch, relay H having a contact set $h_1$, $h_2$, and a conventional relay J whose outputs $J_1$, $J_2$, $J_3$, as in the previous example, control the starting of the motor in the screwing or unscrewing direction.

For locking, contactor 20 is closed. Relay F causes relay G to pick up. The main relay J, which is not energised, starts the motor in the screwing direction.

If jamming occurs, the time when it occurs is the time at which the lateral sliding clearance between the screw and the nut has been taken up. The delayed relay G has therefore not yet dropped. The current relay E responds to the overload caused by the jamming by closing its contacts $e_1$, $e_2$. Relay H therefore picks up by contacts $g_1$, $g_2$ and $e_1$, $e_2$ and its contacts $h_1$, $h_2$ therefore close. Relay J picks up, its contacts $J_1$, $J_3$ make and the motor first stops, then starts to run in the unscrewing direction.

Upon disappearance of the overcurrent, detector E opens its contacts $e_1$, $e_2$; however, energisation of relay H is interrupted at the contacts $h_1$, $h_2$ by the delayed relay F dropping either slightly before or slightly after the opening of the contacts $e_1$, $e_2$. The now de-energised relay H drops after a time in which the nut has moved about 25 percent of a pitch relatively to the screw. The relay J, since it is not energised, drops in turn. The motor stops, then restarts in the screwing direction and runs until the completion of locking, since the end-of-locking overcurrent detected by the relay E has no effect, the contacts $g_1$, $g_2$ being open. This overcurrent cuts out an interlock relay (not shown) on the general control panel; such relay should be adjusted to react more slowly than the detector E.

I claim:

1. A locking device for connecting a barge and a pusher tug, comprising: two elements adapted to slide longitudinally relatively to one another; a screw on one element and a nut on the other element engaged on said screw, the screwthreads of the screw and of the nut being interrupted in longitudinal bands which are the same width as one another, and separated in pairs by bands of screwthreads of the same width as the interrupting bands; a screwthreaded ring screwed into a tapped bearing surface of the nut-bearing other element, such bearing surface being on the same axis, in the same direction and of the same pitch as the screwthreading of the nut; friction means between the ring and the nut for rotating the nut via the ring; drive means for rotating the ring around its axis, and abutment means to limit the rotation of the nut between one position in which the interrupted screwthreads of the screw and nut are fully engaged and another position in which the interrupted screwthreads of the screw and nut are fully disengaged.

2. The device of claim 1 wherein the drive means comprise a force limiter.

3. The device of claim 1, also comprising: a detector for checking on the relative position of the nut and screw; means for temporarily reversing the direction of drive means rotation when the detector finds that the nut is near a jamming position on the screw at the start of the locking operation and for cancelling such reversal after the screw has shifted relatively to the nut by a fraction of the pitch so that the nut resumes rotation in the screwing direction; and means for cutting the detector out of circuit until the subsequent locking operation.

4. The device of claim 3 wherein the temporarily operating means comprise a transient-make relay which is controlled by the detector and which controls a delayed relay, the latter in turn controlling a reversing relay which is connected in the drive means control circuit and which is responsible for the sticking of the delayed relay.

5. The device of claim 1 wherein means are provided to detect stoppage of the drive means after the starting thereof and to temporarily reverse the direction of drive means rotation so as to move the nut back by a fraction of the pitch, whereafter the nut resumes its rotation in the screwing direction, to prevent jamming of the nut on the screw.

6. The device of claim 5 wherein the means comprise a short-duration contact relay controlling a first delayed relay, one contact of which is in series with one contact of a drive means stoppage detector and controls a second delayed relay which controls a reverser connected in the drive means circuit.

7. The device of claim 6 wherein the drive means comprise an electric motor and the stoppage detector is a current detector.

* * * * *